United States Patent
Wüst et al.

(10) Patent No.: US 6,467,184 B1
(45) Date of Patent: Oct. 22, 2002

(54) MEASURING APPARATUS PROVIDED WITH A STYLUS

(75) Inventors: Robert Wüst, Courroux; Jacques Schnyder, Bévilard, both of (CH)

(73) Assignee: Schnyder & Cie S.A. (CH)

( * ) Notice: Subject to any disclaimer, the term of this patent is extended or adjusted under 35 U.S.C. 154(b) by 69 days.

(21) Appl. No.: 09/693,768

(22) Filed: Oct. 20, 2000

(30) Foreign Application Priority Data

Oct. 30, 1999 (EP) ................................................ 9912172

(51) Int. Cl.⁷ ................................................ G01B 3/38
(52) U.S. Cl. .......................................... 33/832; 33/783
(58) Field of Search .......................... 33/832, 783, 784, 33/792, 793, 803, 805, 813, 831, 833, 501.7, 501.11, 501.12, 501.14, 556, 559

(56) References Cited

U.S. PATENT DOCUMENTS

| | | | | |
|---|---|---|---|---|
| 3,197,876 A | * | 8/1965 | Smith | 33/556 |
| 3,224,103 A | * | 12/1965 | Kiralfy | 33/832 |
| 4,129,949 A | * | 12/1978 | Callaghan, Jr. | 33/832 |
| 4,459,755 A | * | 7/1984 | Gruhler | 33/832 |
| 4,553,337 A | * | 11/1985 | Brewster | 33/784 |
| 5,072,522 A | | 12/1991 | Stott et al. | 33/503 |
| 5,121,551 A | * | 6/1992 | Linder et al. | 33/556 |
| 5,937,533 A | * | 8/1999 | Meyer et al. | 33/832 |

FOREIGN PATENT DOCUMENTS

GB   2 039 673   8/1980

* cited by examiner

Primary Examiner—Christopher W. Fulton
(74) Attorney, Agent, or Firm—McGlew and Tuttle, P.C.

(57) ABSTRACT

A measuring apparatus is provided with a stylus (30), including a column (12), a carriage (14) slidably mounted on the column (12) and a stylus carrier (32). The stylus carrier (32) carries the stylus (30) and is secured to the carriage (14). The stylus carrier (32) is provided with a bar (42) and a support (44). The support (44) is secured to one of the ends of the bar (42). The stylus (30) is secured to the support (44). The carriage (14) is provided with two supports (54, 56) arranged longitudinally on one of the sides of the slide (52), one at each of its ends. The two supports (54, 56) are in contact with one of the faces of the bar (42). A locking member (58) is formed of a lock (74) and cooperates with the other face of the bar (42). A spring (78) generates a blocking force (F) which applies the lock (74) against the bar (42). The force (F) is oriented along an axis passing between the two supports (54, 56).

8 Claims, 4 Drawing Sheets

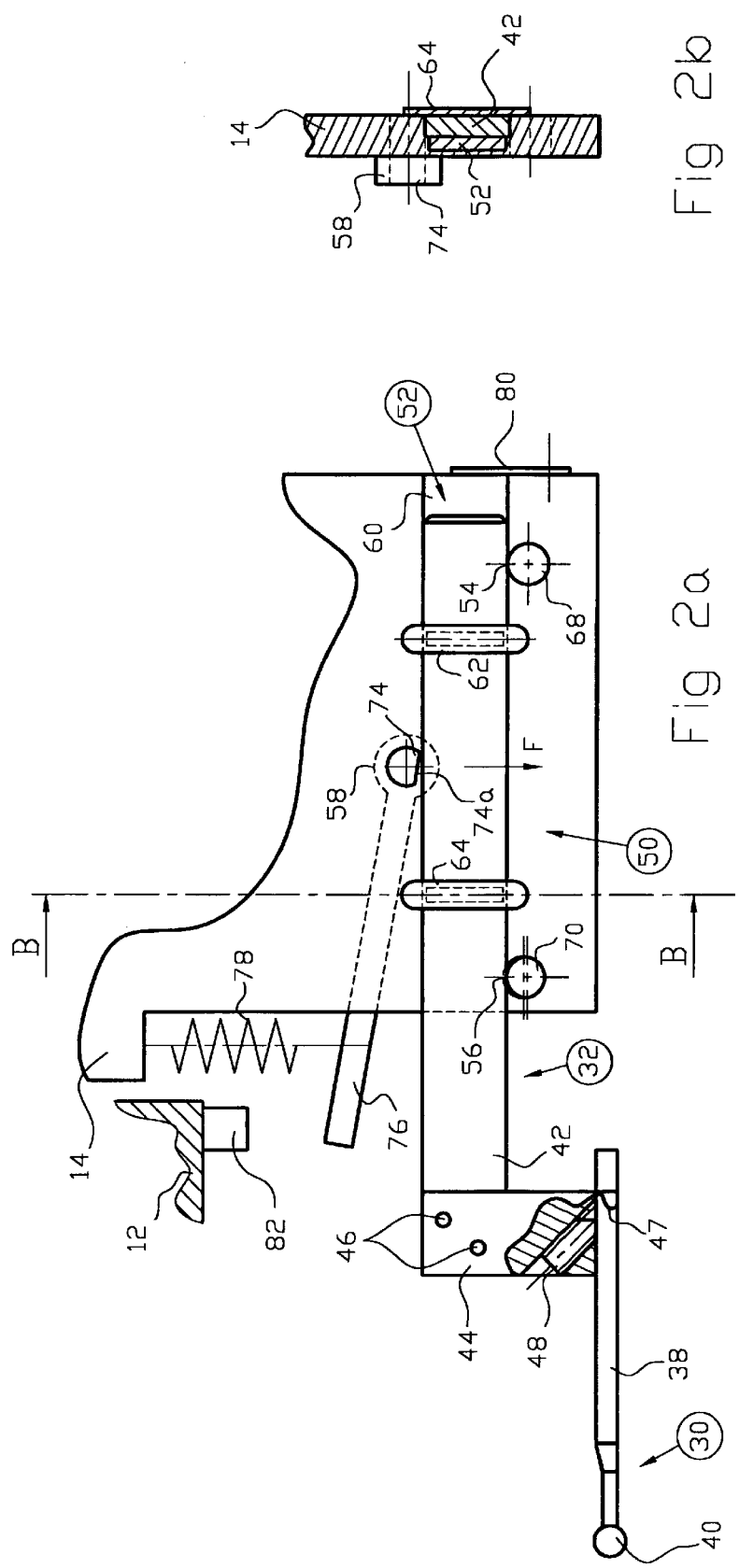

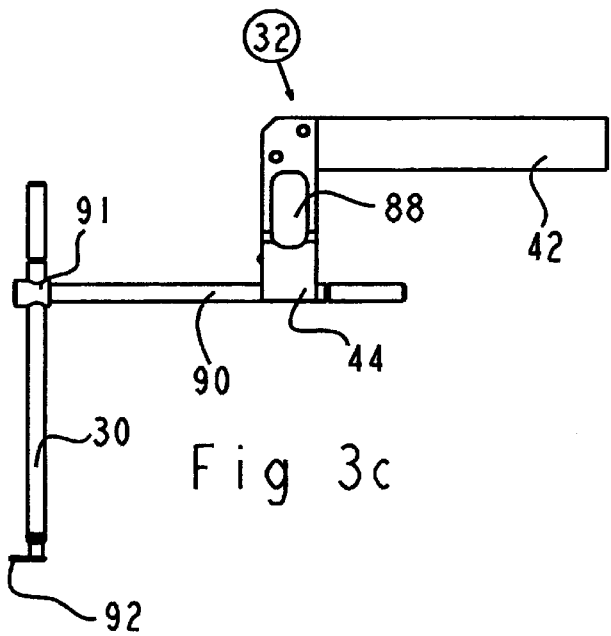
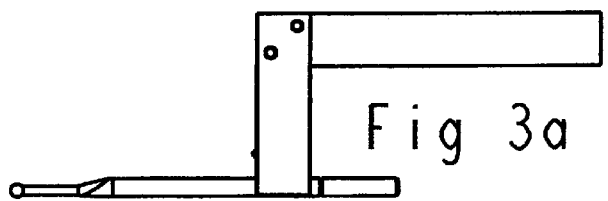
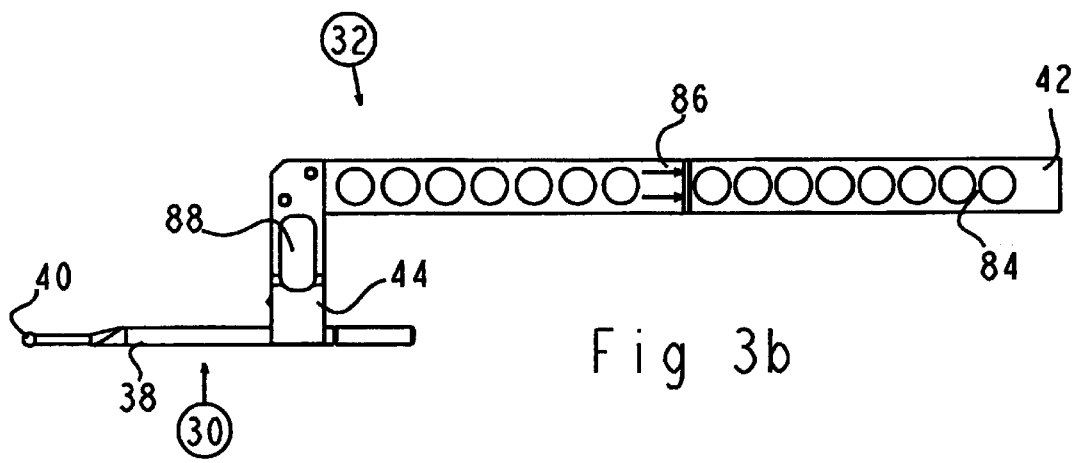

MEASURING APPARATUS PROVIDED WITH A STYLUS

FIELD OF THE INVENTION

The present invention relates to a measuring apparatus provided with a stylus or a probe. The invention more particularly concerns an apparatus including a sliding carriage and a stylus carrier, secured to the carriage and on which the stylus is mounted. In the apparatus according to the invention, the stylus carrier includes a metal bar of a polygonal cross section with at least two plane faces, and a support which is secured to one of the ends of the bar and on which the stylus is secured, the other end of the bar being mounted on the carriage.

BACKGROUND OF THE INVENTION

An apparatus of this type is disclosed in U.S. Pat No. 5,072,522. This apparatus includes a base and a column secured to the base. A carriage is mounted so as to slide on the column and it is connected to a counterbalance weight, so that it remains in any position between the two ends of the column. A stylus is mounted on a stylus carrier, which is itself secured to the carriage. U.S. Pat. No. 5,072,522 neither describes nor shows the means for securing the stylus carrier onto the carriage.

UK Patent No. 2 039 673 discloses an entirely comparable apparatus. In this case, the stylus carrier is secured to the carriage by a U-shaped part and a knurled screw screwed into the carriage. Such a solution certainly allows the stylus carrier to be rigidly connected onto its support. However, the replacement of the stylus carrier poses a problem, since the position of the stylus carrier set in place cannot be guaranteed. It is thus necessary to begin by orienting the stylus carrier approximately, then re-calibrating the apparatus before being able to effect a new measurement. Moreover, the tightening torque may vary considerably from one person to another, so that the rigidity of the assembly can be problematic. Such a solution is not sufficient if one wishes to be able to effect successive measurements with several stylus carriers, without having to effect long adjustments.

SUMMARY OF THE INVENTION

The main object of the present invention is to allow a stylus carrier to be quickly and precisely set in place on such an apparatus.

This object is achieved as a result of the fact that the carriage of the device according to the invention is provided with a slide, having a cross section into which the cross section of the bar fits, which includes a first end in which the bar is engaged provided with two supports arranged longitudinally on one of the sides of the slide, one at each of its ends, and intended to be in contact with one of the faces of the bar. A locking member formed of a lock cooperates with the other face. A spring generates a blocking force which applies the lock against the bar, the force being oriented along an axis passing between the two supports. Advantageously, the bar is of rectangular cross section the sides of which have a ratio between 1/3 and 1/5.

In a particularly simple and efficient embodiment, the lock is formed of a cylindrical rod provided with a flat side parallel to the axis of the cylinder and which rests on the stylus carrier via one of the edges defining the transition between the flat side and the cylindrical portion of the rod. The spring is of the helical type, with two ends, one being secured to the carriage. The locking member further includes a lever, secured to the rod at its pivoting point and which cooperates with the other end of the spring, to generate the blocking force.

In order to simplify the unlocking of the stylus carrier, the column is provided with a stop block against which the lever abuts at the end of its travel, so as to generate an opposite force to the locking force.

In order to facilitate the positioning of the stylus carrier, the slide is closed by a stop at its opposite end to that in which the stylus carrier is engaged.

Advantageously, the apparatus includes a column, on which the carriage is slidably mounted, and a counterbalance weight, which is also slidably mounted on the column and which is connected to the carriage, in order to balance them. Such a construction allows the stylus to be placed in any position, and it remains there thanks to the counterbalance weight. However, when during a measurement, the stylus carrier has to be changed, the balance of the carriage and the counterbalance weight may be destroyed. In order to overcome this difficulty, the stylus carrier may include cut out portions which lighten it. Consequently, it is possible to use stylus carriers of different types, without having to perform any particular adjustment.

In a particularly advantageous embodiment, the measuring apparatus further includes an electronic measuring arrangement, a base, a column secured to the base, on which the carriage is slidably mounted. In this embodiment:

the column carries a measuring scale;

the carriage is provided with a reader cooperating with the scale and connected to the electronic measuring arrangement; and the stylus, which is movable along an axis parallel to the direction of engagement of the bar in the slide, is provided with electrically controlled measuring means, which are also connected to the electronic arrangement.

The movement amplitude of a stylus as defined above is unfortunately very limited. This is why, in order to allow a measurement of the same order of magnitude as is allowed by the movement of the carriage, in a particular embodiment, the apparatus further includes a ruler, oriented parallel to the axis of mobility of the stylus, and a reader head provided with electrically controlled measuring means cooperating with the ruler, one secured to the base and the other to the support. In this apparatus, the measuring means associated with the stylus and the head are connected to the electronic measuring arrangement which is arranged to add the measured values, thus giving the value of the dimension measured along an axis perpendicular to the movement of the carriage and parallel to the direction of mobility of the stylus.

BRIEF DESCRIPTION OF THE DRAWING

Other advantages and features of the invention will appear from the following description, made with reference to the annexed drawing, in which:

FIG. 2a is an enlarged front partially sectional view of a portion of the apparatus of FIG. 1;

FIG. 2b is an enlarged cross sectional view taken along line B—B of FIG. 2b of a portion of the apparatus of FIG. 1;

FIG. 3a is a side view of an embodiment of a stylus carrier for use in the apparatus according to the invention;

FIG. 3b is a side view of another embodiment of a stylus carrier for use in the apparatus according to the invention;

FIG. 3c is a side view of another embodiment of a stylus carrier for use in the apparatus according to the invention.

DESCRIPTION OF PREFERRED EMBODIMENTS

Figure 1:
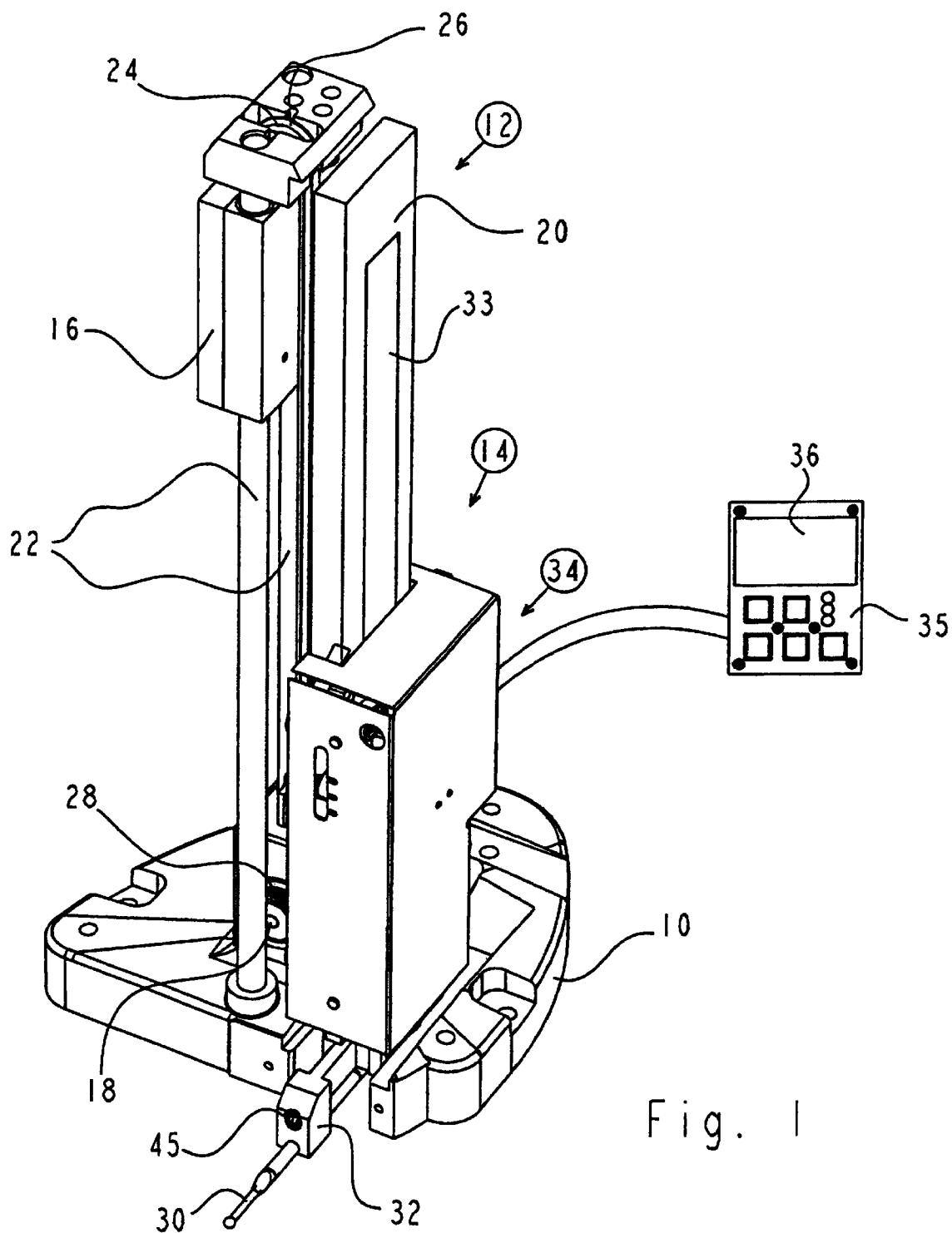
FIG. 1 is a perspective view of a measuring apparatus according to a first embodiment of the invention.

The measuring apparatus of FIG. 1 essentially includes a base 10, a column 12 secured to the base 10, a carriage 14, a counterbalance weight 16 and a motor 18.

The column 12 includes a pillar 20, of generally rectangular shape and two rods 22, on which slide respectively carriage 14 and counterbalance weight 16. These latter are connected to each other by means of a belt 24 forming a loop which passes over a first pulley 26 arranged at the top of column 12 and over a second pulley 28 arranged at its base and driven by motor 18. In order to effect measurements, the apparatus is provided with a stylus 30 mounted on a stylus carrier 32. The stylus carrier 32 is itself secured to carriage 14, by means which will be specified hereinafter.

In a conventional manner, the measuring apparatus includes a measuring scale 33 bonded onto pillar 20 and a reader 34 secured to carriage 14, as well as an electronic measuring arrangement, schematically shown at 35. The electronic measuring arrangement schematically shown at 35 is connected to motor 28 and reader 34, thus assuring the reading of the carriage's position, the driving and stopping thereof, so that the measuring contact pressure is constant. The data is made accessible by means of a display 36.

As can be seen more particularly in FIG. 2, stylus 30 is formed of a cylindrical rod 38 made of precision ground tempered steel. One of the ends of the cylindrical rod 38 carries a ruby sphere 40. The stylus carrier 32 includes a parallelepiped bar 42 made of stainless steel and a support 44 made of blackened steel. The support 44 is secured to bar 42 by pins 46. The stylus carrier 32 includes a groove 47 in which stylus 30 is housed. A screw 48, mounted in a threaded hole made in support 44 and opening out into groove 47, allows stylus 30 to be blocked on stylus carrier 32.

The bar 42 has a rectangular cross section with a ratio between the sides between 1/3 and 1/5. Typically, and for an apparatus having a measuring amplitude of 60 cm, the bar has a width of 12 mm and a thickness of 3 mm.

The stylus carrier 32 provided with stylus 30 together form a tool secured to carriage 14 via a securing device 50. The securing device 50 is formed of a slide 52, two supports 54 and 56 and a blocking member 58.

The slide 52 is formed by a groove 60 made in the body of carriage 14. The depth and width of the groove 60 are respectively slightly greater than the thickness and the width of bar 42, so that the latter can be freely engaged therein. Two plates 62 and 64 are secured onto carriage 14, for example by means of screws which are not shown in the drawing. The two plates 62 and 64 extend above groove 60, so as to prevent lateral release of the bar 42.

The carriage 14 includes two holes pierced in its thickness and which open out into groove 60, on one of the sides. A pin 68 made of tempered steel is engaged in the first and secured by being driven therein. A cam 70 is located in the second, provided with means for rotating and blocking it, which have not been shown in the drawing to facilitate the reading thereof. The pin 68 and cam 70 respectively form supports 54 and 56 of the securing device. The cam 70 allows the alignment of stylus carrier 42 to be adjusted with respect to the bottom of base 10, so that they are parallel to each other.

The carriage 14 includes a third hole, also pierced in its thickness and which opens out into groove 60 on the other of its sides, in which pivots blocking member 58, formed of a cylindrical rod 74 provided with a flat side 74a, a lever 76 and a helical spring 78. When flat side 74a is arranged parallel to the sides of groove 60, the distance between this flat side and a straight line tangential to the two supports 54 and 56 is slightly greater than the width of bar 42, so that the latter can be slid into slide 52.

The lever 76 is screwed onto rod 74 so that they are secured to one another and so that flat side 74a is turned towards groove 60. The spring 78 is secured by one of its ends to carriage 14 and by the other to lever 76. The spring 78 thus exerts a torque causing rod 74 to rotate in its hole, until it rests via one of the ends of flat surface 74a on one of the sides of bar 42. This results in a force F applied onto bar 42 and oriented along an axis passing between the two supports 54 and 56. Typically, this force may be of the order of 10 to 20 N. The spring must therefore exert a force of 1 N when the ratio between the diameter of rod 74 and the point of attachment of spring 78 onto lever 76 is equal to 1/10.

The slide is closed by means of a stop 80 at the opposite end thereof to that in which bar 42 is engaged. This stop 80 is secured to carriage 14 by conventional means, for example by means of screws which are not shown in the drawings.

In order to set stylus carrier 32 in place on carriage 14 and remove it therefrom, lever 76 need only be rotated, so that flat side 74a is substantially parallel to the side of bar 42. This may be achieved by pressing directly onto lever 76. In this case, lever 76 must project from the case of the measuring apparatus which may pose problems in certain conditions.

In the structure shown in FIG. 2, unlocking occurs by moving the carriage up to the top of column 12. The latter carries a pin 82 forming a stop block, against which lever 76 abuts, which causes it to swing and thereby unlock bar 42.

Such a securing device is very easy to handle, so that the tool formed by the stylus carrier and the stylus associated therewith, may easily be replaced by another. It is thus possible to access all the points to be measured on a workpiece or an apparatus, with a minimum of manipulations.

FIGS. 3a, b and c show different tools formed of stylus carriers and associated styli, allowing measurements in more or less particular conditions. FIG. 3a shows a short tool allowing measurements in normal conditions. FIG. 3b shows a tool in which the stylus carrier includes a long bar for measuring points far from the column. FIG. 3c shows a tool for effecting measurements inside hollow regions.

The tool shown in FIG. 3a has already been described with reference to FIG. 2. It has been shown to allow comparison with the others.

FIG. 3b shows a tool which includes a bar 42 close to three times longer than that of FIG. 3a, provided with round lightening holes 84. It carries a mark 86 the function of which will be specified hereinafter. Support 44 includes a cut out portion 88 in its central portion. Holes 84 and cut out portion 88 considerably lighten the tool, without thereby affecting its rigidity. The weight of the tool is, thus, practically the same as that shown in FIG. 3a. It is thus possible to avoid correcting the balance each time that the stylus carrier is changed. Tests carried out have shown that with a ratio comprised between 1/3 and 1/5, typically from 1 to 4 between the height and thickness of bar 42, it is possible to make rigid and high performance tools, with weights sufficiently close to each other that the balance of the carriage and counterbalance weight does not have to be modified.

Mark 86 allows an operator to check whether the bar is in the correct position, i.e. abutting against stop 80. The operator thus need only ensure that this mark is aligned on the edge of the case protecting the apparatus.

The tool of FIG. 3c includes a stylus carrier 32 provided with a horizontal rod 90 one end of which is secured to support 44 while the other is provided with a sleeve 91 in which stylus 30 is engaged and secured by a screw which is not shown. The bottom end of stylus 30 carries a thin finger 92, arranged parallel to bar 42 which allows measurements to be taken in grooves or hollow regions.

Support 44 is provided with a cut out portion 88, like the tool in FIG. 3b. This cut out portion 88 is sufficient to obtain an equivalent weight to the tools of FIGS. 3a and 3b.

The apparatus described with reference to FIG. 1 allows dimensions to be measured along a single vertical axis. For certain applications, it may be desirable to be able to effect a measurement along a second horizontal axis. The apparatus partially shown in FIG. 4 allows such a measurement. Base 10 of the apparatus is arranged on a table 94. It is fitted with a tool formed of a stylus carrier 32 and a stylus 95, of a type including associated measuring means such as, for example, the styli sold under the brand name SYLVAC (Switzerland), reference 930.2146. Stylus 95 includes a cylindrical rod 96, which is movable along its axis, with an amplitude of approximately 10 mm.

The base 10 carries a notch 98. The apparatus further includes a complementary measuring apparatus formed of a ruler 100 and a reader head 102, for example of the inductive type, wherein ruler 100 is slidably mounted. This ruler is of a conventional type, with a millimetric scale, not shown in the drawings and arranged facing reader head 102. It is rigidly secured to base 10 in its notch 98.

Stylus 95 and reader head 102 are connected to electronic measuring arrangement 35. The electronic measuring arrangement 35 includes means allowing an addition to be performed, to make the sum of the dimensions measured by them.

Despite the fact that stylus 95 includes measuring means of its own, the weight of the tool remains entirely acceptable and may be adjusted by holes 84 made in bar 42 and by cut out portion 88 of support 44, so that the balance of the carriage is not affected.

Figure 4:
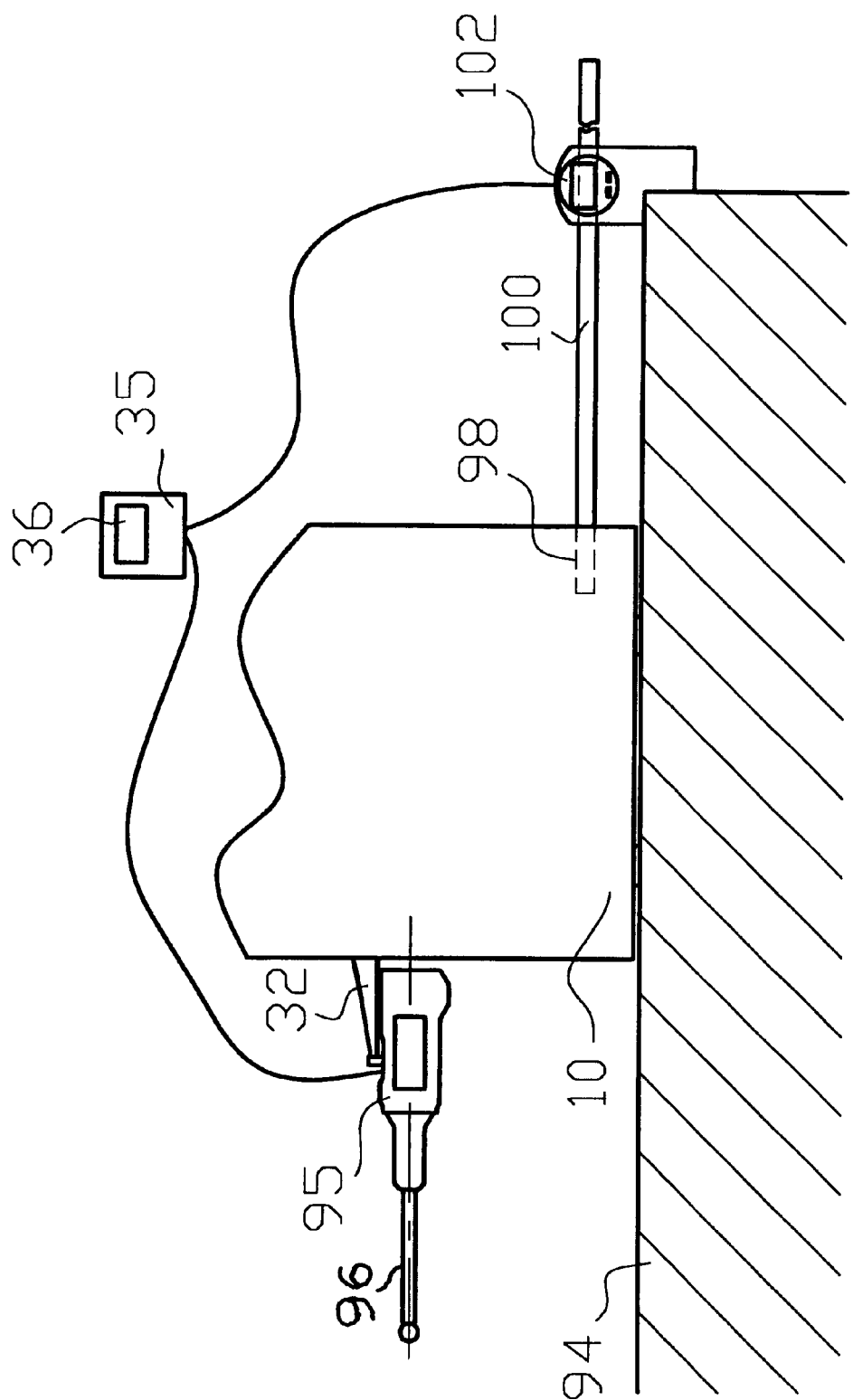
FIG. 4 is a side partially sectional view showing an apparatus according to a second embodiment of the invention for allowing measurement to be made along two axes.

In order to effect a measurement along a horizontal axis, by means of the apparatus of FIG. 4, base 10 need only be slid along the table, until stylus 95 comes into contact with the object to be measured. Because stylus 95 includes a retractable rod 96, the movement of base 10 may occur in a very approximate way. With a precision corresponding to the measuring amplitude of stylus 95, electronic arrangement 35 then calculating the exact dimension, equal to the sum of the dimensions measured by stylus 95 and reader head 102.

Thus, as a result of the fact that the apparatus is provided with a particular stylus carrier, with a carriage which is fitted thereto, it is possible to considerably improve its operation, to simplify the handling thereof and increase the measuring possibilities, without substantially increasing the cost price of the apparatus.

We claim:

1. A measuring apparatus provided with a stylus, including a column, a carriage slidably mounted on the column and a stylus carrier, secured to the carriage and on which the stylus is mounted, wherein the stylus carrier includes a metal bar with at least two plane faces and a support, secured to one of the ends of the bar and on which the stylus is secured, the other end of the bar being mounted on the carriage, wherein the carriage is provided with a slide with a cross section in which the cross section of the bar fits, which includes two ends in one of which the bar is engaged and which is provided with two supports arranged longitudinally on one of the sides of the slide, one at each of its ends, and intended to be in contact with one of the faces of the bar, and a locking member formed of a lock, cooperating with the other face, and a spring, generating a blocking force which applies the lock against the bar, the force being oriented along an axis passing between the two supports.

2. An apparatus according to claim 1, wherein the bar has a rectangular cross section the sides of which have a ratio comprised between 1/3 and 1/5.

3. An apparatus according to claim 1, wherein:
the lock is formed of a cylindrical rod provided with a flat side parallel to the axis of the cylinder and which rests on the stylus carrier via one of the edges defining the transition between the flat side and the cylindrical portion of the rod,
the spring is of the helical type, with two ends, one being secured to the carriage,
the locking member further includes a lever secured to the rod at its pivoting point and which cooperates with the other end of the spring, to generate the blocking force.

4. An apparatus according to claim 3, wherein the column is provided with a stop block against which the lever abuts at the end of its travel, so as to generate an opposite force to the locking force.

5. An apparatus according to claim 1, wherein the slide is closed by a stop at the end thereof opposite to that in which the bar is engaged.

6. An apparatus according to claim 1, wherein it further includes, a counterbalance weight also slidably mounted on the column and connected to the carriage, and wherein the stylus carrier includes cut out portions to lighten it, so that it is possible to use stylus carriers of different types, without having to effect balance adjustments between the carriage fitted with different stylus carriers and the counterbalance weight.

7. An apparatus according to claim 6, wherein it further includes an electronic measuring arrangement, a base carrying said column and wherein
the column carries a measuring scale,
the carriage is provided with a reader cooperating with said scale and connected to the electronic measuring arrangement, and
the stylus, provided with a rod movable along an axis perpendicular to the axis of movement of the carriage, is provided with electrically controlled measuring means, which are also connected to said electronic arrangement.

8. An apparatus according to claim 7, arranged on a support and further including a ruler oriented parallel to the axis of mobility of the rod of the stylus, and a reader head provided with electrically controlled measuring means and cooperating with the ruler, one secured to the base, the other to the support, wherein the measuring means associated with said stylus and the reader head are connected to the electronic measuring arrangement which is arranged to add the measured values, thus giving the value of the dimension measured along an axis perpendicular to the movement of the carriage and parallel to the direction of mobility of the stylus.

* * * * *